United States Patent Office 3,296,227
Patented Jan. 3, 1967

3,296,227
PRODUCTION OF DIENE POLYMERS WITH A RHODIUM NITRATE CATALYST IN A 2-ETHYLENIC ALCOHOL AS DILUENT
John E. Burleigh and Samuel R. Collins, Bartlesville, Okla., assignors to Phillips Petroleum Company, a corporation of Delaware
No Drawing. Filed June 3, 1963, Ser. No. 284,830
18 Claims. (Cl. 260—82.1)

This application relates to the production of diene polymers. In one aspect this invention relates to a method for polymerizing 1,3-butadiene to a polymer of butadiene having a high percent of trans 1,4-addition.

In recent years, there has been considerable activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a certain configuration, has aroused a great deal of interest. The polymer so formed by use of these catalysts, particularly the butadiene and isoprene polymers, often have outstanding physical properties which render them equal to or even superior to natural rubbers. As a result, the synthetic rubbers are in many applications supplementing, or even replacing, natural rubbers. For example, trans-1,4-polybutadiene prepared with stereospecific catalyst has been found to be an excellent substitute for balata or gutta-percha.

It is known that butadiene can be polymerized in the presence of rhodium salts such as rhodium chloride and rhodium nitrate to give polymers having a high percentage of trans configuration. Polymerizations employing said catalysts have been carried out in aqueous emulsion systems and in solution systems employing ethyl alcohol as diluent or reaction medium.

We have now discovered that when a 2-ethylenic alcohol is employed as the diluent instead of ethyl alcohol, and rhodium nitrate is employed as the initiator or catalyst in the polymerization of butadiene and isoprene, the conversion is markedly increased. This was surprising because the presence of the

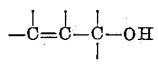

structure, which might be expected to interfere with the polymerization, behaved in the opposite way, i.e., it enhanced polymerization. It was therefore entirely unexpected to discover that a particular group of materials belonging to the general class of alcohols which, when employed as diluents, increased the yield of polymer.

Thus, broadly speaking, the present invention comprises the step of contacting 1,3-butadiene, isoprene, or mixtures thereof, with a rhodium nitrate catalyst in the presence of a 2-ethylenic alcohol containing from 3 to 10 carbon atoms per molecule, and recovering the polymer so produced. When the diene being polymerized is 1,3-butadiene, the polymer obtained contains a high percentage of trans 1,4-addition, e.g., at least 70 to 90 percent, or higher. When the diene being polymerized is isoprene, the polymer obtained contains a predominant amount of cis 1,4-addition. When a mixture of said dienes is polymerized to obtain a copolymer, the structure of said copolymer will depend upon the relative amounts of said two monomers which are present in the reaction mixture.

An object of this invention is to provide a new process for polymerizing conjugated dienes such as 1,3-butadiene, isoprene, or mixtures thereof. Another object of this invention is to provide a new class of diluents which can be employed in polymerizing 1,3-butadiene, isoprene, or mixtures thereof, to obtain markedly increased polymerization rates. Another object of this invention is to provide a new method for polymerizing 1,3-butadiene, isoprene, or mixtures thereof, in the presence of a rhodium nitrate catalyst and a 2-ethylenic alcohol having from 3 to 10 carbon atoms per molecule as a diluent. Other aspects, objects, and advantages of the invention will be apparent to those skilled in the art in view of this disclosure.

Thus, according to the invention there is provided a method for polymerizing a conjugated diene selected from the group consisting of 1,3-butadiene, isoprene, and mixtures thereof, which comprises the step of contacting said diene under polymerization conditions with a rhodium nitrate catalyst in the presence of a diluent selected from the group consisting of 2-ethylenic alcohols having a formula selected from the group consisting of

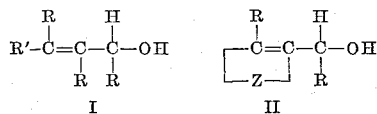

wherein: the total number of carbon atoms in the molecule is in the range of from 3 to 10 inclusive; each R is selected from the group consisting of a hydrogen atom, and methyl and ethyl radicals; R' is selected from the group consisting of a hydrogen atom, alkyl, cycloalkyl, alkylcycloalkyl, aryl, aralkyl, and alkaryl radicals; and Z is a bivalent

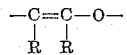

radical wherein each R is as defined above.

It will be noted that in the above group of ethylenic alcohols the carbon atom having the OH group attached thereto is attached to a carbon atom which in turn is attached to a double bond, and that said double bond can be in an open chain aliphatic compound such as allyl alcohol, a substituted open chain aliphatic compound such as cinnamyl alcohol, or in a cycloaliphatic ring such as in furfuryl alcohol.

Thus, as employed herein and in the claims, unless otherwise specified, the terminology "2-ethylenic alcohol" includes those alcohols containing from 3 to 10 carbon atoms per molecule and wherein the carbon atom having the OH group attached thereto is attached to a carbon atom having a double bond attached thereto, which double bond can be in an open chain aliphatic compound, a substituted open chain aliphatic compound, or a cycloaliphatic ring. Thus, in the above defined formulas the R substituents can be alkyl groups other than methyl or ethyl.

Examples of the above-described 2-ethylenic alcohols which can be employed as diluents in the practice of the invention, include, among others, the following:

2-propen-1-ol (allyl alcohol)
2-buten-1-ol
2-penten-1-ol
2-decene-1-ol
3-buten-2-ol (methyl vinyl carbinol)
4-hexen-3-ol
3-methyl-2-penten-1-ol
2-ethyl-2-octen-1-ol
2,3-dimethyl-2-hexen-1-ol
3-cyclopentyl-2-propen-1-ol
3-(4-methylcyclohexyl)-2-propen-1-ol
3-phenyl-2-propen-1-ol (cinnamyl alcohol)
3-(4-tolyl)-2-propen-1-ol
2-furanmethanol (furfuryl alcohol)
2-methyl-3-furanmethanol
3,4-dimethyl-2-furanmethanol
3-furanmethanol
2-methyl-4-ethyl-3-furanmethanol
2,5-diethyl-3-furanmethanol The amount of said diluents which can be employed in the practice of the invention can vary over a broad range. Usually, it is preferred to employ an amount of diluent which is within the range of from 50 to 1000 parts by weight per 100 parts by weight of monomer or monomers being polymerized. However, greater or lesser amounts can be employed without departing from the spirit and scope of the invention.

The polymerization process of this invention can be carried out at temperatures varying over a relatively wide range, e.g., from 0 to 150° C. However, it is usually preferred to operate at a temperature in the range of 10 to 80° C. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is conducted. However, higher pressures can be used if desired, these pressures being obtained by some such suitable method as the pressurization of the reactor with a gas which is inert with respect to the polymerization reaction.

If desired, a small amount of water can be utilized in the polymerization to facilitate solution or dispersion of the rhodium nitrate catalyst in the reaction mixture. Generally speaking, when water is utilized, not more than 10 weight percent, based on the diluent, will be utilized. In most cases the amount of water utilized is not more than 5 weight percent, based on the diluent.

The amount of rhodium nitrate initiator or catalyst employed in the practice of the invention can be varied over a wide range. Usually, the amount of said catalyst will be in the range of from 0.1 to 10 parts by weight, preferably 0.25 to 7 parts by weight, per 100 parts by weight of monomer or monomers charged to the reaction zone.

The polymerization method of the invention can be carried out as a batch operation or as a continuous operation. Although any suitable charging procedure can be employed, it is usually preferred to charge the diluent to the reactor first, and then the rhodium nitrate catalyst. In one preferred method said catalyst can be conveniently charged as an aqueous solution. It will be understood, however, to be within the scope of the invention to charge said catalyst as a dispersion in a portion of the diluent. In some instances, as when no water is being utilized in the system, the rhodium nitrate catalyst can be charged per se to the reactor first. The monomer (or monomers) is then added after which the reactor is closed, the temperature adjusted to the desired value, and the contents of the reactor agitated for the desired contact time. Usually, in a batch operation said contact time will be within the range of from 5 minutes to 150 hours.

The process can also be carried out continuously by maintaining the above-mentioned concentrations of reaction mixture components in the reactor for a suitable residence time. The residence time in a continuous process will, of course, vary within rather wide limits, depending upon such variables as temperature, pressure, and the catalyst concentration. In a continuous process, the residence time will usually fall within the range of one second to one hour when conditions within the specified ranges are employed.

Upon completion of the polymerization reaction, when a batch process is used, the total reaction mixture is then treated to recover the polymer product. Any suitable method can be utilized in carrying out this treatment of the reaction mixture. In one method, the polymer is recovered by steam stripping the diluent from the polymer. In another suitable method, a material such as methyl alcohol or isopropyl alcohol is added to the mixture so as to cause coagulation of the polymer. The polymer is then separated from the methyl or isopropyl alcohol and diluent by any suitable method, such as decantation or filtration. It has also been found to be advantageous to add an antioxidant, such as phenyl-beta-naphthylamine, 2,2' - methylene - bis(4 - methyl - 6 - tert - butylphenol, 4,4' - methylene - bis - (2,6 - di - tert - butylphenol, tris-nonlyphenyl phosphite, N,N'-diphenyl-p-phenylenediamine, or other well known rubber antioxidant to the reaction mixture prior to recovery of the polymer. This can be accomplished by adding the antioxidant in solution in isopropyl alcohol. After addition of the antioxidant, the polymer present in the reaction mixture can then be coagulated by the addition of an excess of a material such as methyl alcohol or isopropyl alcohol. When the process is carried out continuously, the total effluent from the reactor can be pumped from the reactor to a polymer recovery zone wherein the reactor effluent is treated as described above. It is, of course, to be realized that it is within the scope of the invention to employ other suitable methods to recover the polymer from the reaction mixture.

A more comprehensive understanding of the invention can be obtained by referring to following illustrative examples, which are not intended, however, to be unduly limitative of the invention.

*Example 1*

A series of runs was made for the polymerization of butadiene in the presence of rhodium nitrate as the initiator and either ethyl alcohol or allyl alcohol as the diluent. The following receipe was employed:

| | Parts by weight |
|---|---|
| 1,3-butadiene | 100 |
| Diluent | 200 |
| Water | Variable |
| Rhodium nitrate | 1.0 |
| Temperature, °C. | 50 |
| Time, hours | 16.5 |

In these runs the diluent was charged first, the reactor was purged with nitrogen, an aqueous solution of the rhodium nitrate in the stated amount of water was added (see below), and the monomer was introduced last. When no water was used, the rhodium nitrate was charged per se to the reactor first, the diluent was charged and then the monomer. After all the ingredients had been charged to the reactor, the temperature was adjusted to the stated level, and the reactants agitated. The polymerizations were carried out under autogenous pressure. At the conclusion of the polymerization runs, 0.2 gram per 100 grams of monomer of the antioxidant, 2,2'-methylene-bis(4-methyl-6-tert-butylphenol), dissolved in isopropyl alcohol, was added to each reaction mixture (concentration of antioxidant solution was 5 grams per liter of solution) and the polymer was recovered by stripping off the diluent and isopropyl alcohol.

TABLE I

| Run No. | Diluent | Initiator | Water Added, wt. percent[1] | Conv., percent | Yield, g./g./hr.[2] |
|---|---|---|---|---|---|
| 1 | Ethyl alcohol | Rhodium nitrate | 0.0 | 13.1 | 0.80 |
| 2 | ---do--- | ---do--- | 0.1 | 12.1 | 0.73 |
| 3 | ---do--- | ---do--- | 3.0 | 13.0 | 0.79 |
| 4 | ---do--- | ---do--- | 5.0 | 12.5 | 0.76 |
| 5 | ---do--- | ---do--- | 10.0 | 12.8 | 0.78 |
| 6 | ---do--- | ---do--- | 20.0 | 10.7 | 0.65 |
| 7 | Allyl alcohol | ---do--- | 0.0 | 47.7 | 2.9 |
| 8 | ---do--- | ---do--- | 0.1 | 50.0 | 4.0 |
| 9 | ---do--- | ---do--- | 5.0 | 46.3 | 2.8 |
| 10 | ---do--- | ---do--- | 10.0 | 45.0 | 2.7 |
| 11 | Ethyl alcohol | Rhodium chloride | 5.0 | 0 | 0 |
| 12 | Allyl alcohol | ---do--- | 5.0 | 0 | 0 |

[1] Based on diluent.
[2] Grams polymer per gram initiator per hour.

These data show that water had no appreciable effect on the reaction. Comparison of Runs 1–6 with Runs 7–10 shows that the conversion was markedly improved when allyl alcohol was used as the diluent instead of ethyl alcohol. Runs 11 and 12 show that no polymerization occurred when rhodium chloride was substituted for rhodium nitrate.

*Example II*

The recipe given in Example I was employed in another series of runs for the polymerization of butadiene in the presence of rhodium nitrate as the initiator. Ten parts by weight of water was added in each run. The polymerization temperature was 50° C. but the reaction time varied. A variety of diluents was employed, with ethyl alcohol being used as a control. In order to facilitate comparison of results, yields calculated as g./g./hr. are reported on a relative basis using ethyl alcohol as 1. Results are shown in Table II.

TABLE II

| Run No. | Diluent | Reaction Time, Hours | Relative Yield EtOH=1 g./g./hr. |
|---|---|---|---|
| 1 | Ethyl alcohol | 16.3 | 1.0 |
| 2 | Methyl alcohol | 16.3 | 0.64 |
| 3 | Isopropyl alcohol | 16.3 | 0.85 |
| 4 | n-Butyl alcohol | 18 | 1.0 |
| 5 | Isobutyl alcohol | 18 | 1.0 |
| 6 | Sec-butyl alcohol | 24 | 0.43 |
| 7 | Tert-butyl alcohol | 24 | 0.25 |
| 8 | n-Amyl alcohol | 24 | 0.73 |
| 9 | Isoamyl alcohol | 18 | 0.68 |
| 10 | Ethylene glycol | 24 | 0.012 |
| 11 | Allyl alcohol | 18 | 4.05 |
| 12 | Methyl vinyl carbinol | 51.2 | 3.32 |
| 13 | Cinnamyl alcohol | 51.2 | 3.48 |
| 14 | Furfuryl alcohol | 34.7 | 3.34 |
| 15 | 2-buten-1-ol | 39 | 2.56 |

Microstructure was determined on the polymer from Run 11 in which allyl alcohol was employed as the diluent. Results showed a trans content of 97.3 percent and a vinyl content of 2.8 percent.

The above data show that saturated alcohols, including ethylene alcohol, used in Runs 2 through 10 gave no improvement over ethyl alcohol as diluents, and in most instances gave poorer results than ethyl alcohol. However, marked improvements are demonstrated in Runs 11 through 15 in which diluents of the invention were employed.

The microstructure determination referred to above was carried out as follows. The polymer sample was dissolved in carbon disulfide to form a solution having 25 grams of polymer per liter of solution. The infrared spectrum of the solution (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mole$^{-1}$-centimeters$^{-1}$); $E$=extinction (log $I_0/I$); $t$=path length (centimeters); and $c$=concentration (moles double bond/liter). The extinction was determined at the 10.35 micron band and the extinction coefficient was 146 (liters-moles$^{-1}$-centimeters$^{-1}$).

The percent of the total unsaturation as 1,2-(or vinyl) was calculated according to the above equation, using the 11.0 micron band and an extinction coefficient of 209 (liters-moles$^{-1}$-centimeters$^{-1}$).

The percent of the total unsaturation present as cis 1,4- can be obtained by subtracting the trans 1,4- and 1,2-(vinyl) determined according to the above procedures from the theoretical unsaturation, assuming one double bond per each $C_4$ unit in the polymer.

*Example III*

Two additional runs were made following the procedure of Example II except that the polymerization temperature was 5° C. and reaction time was 145.4 hours. Diluents employed were ethyl alcohol and allyl alcohol. The data presented in Table III below demonstrate again the marked improvement that is obtained with allyl alcohol as the diluent.

TABLE III

| Run No. | Diluent | Relative Yield EtOH=1 g./g./hr. |
|---|---|---|
| 1 | Ethyl alcohol | 1.0 |
| 2 | Allyl alcohol | 3.2 |

*Example IV*

Two runs were made for the polymerization of isoprene employing rhodium nitrate as the initiator and either allyl alcohol or ethyl alcohol as the diluent. The following recipe was used:

| | Parts by weight |
|---|---|
| Isoprene | 100 |
| Diluent | 200 |
| Water | 10 |
| Rhodium nitrate | 1 |
| Temperature, ° C. | 50 |
| Time, hours | 95.7 |

In each of the runs the diluent was charged first after which the reactor was purged with nitrogen. An aqueous solution of rhodium nitrate was then introduced followed by the isoprene. The temperature was adjusted to 50° C. and the mixture agitated throughout the polymerization period.

At the conclusion of the polymerization the reaction mixture was poured into an isopropyl alcohol solution of 2,2'-methylene-bis(4-methyl-6-tert-butylphenol). Said solution contained 5 grams of the antioxidant per liter of solution and the amount of solution used was sufficient to provide about two grams of antioxidant per 100 grams monomer charged to the polymerization. The supernatant liquid was removed from the resulting mixture and the lower polymer layer was dissolved in benzene and then precipitated with isopropyl alcohol. This procedure was repeated after which the polymer was taken up in benzene, the benzene solution washed with water, and the polymer recovered by stripping off the benzene. The following results were obtained from the two runs:

|  | Diluent | |
|---|---|---|
|  | Ethyl Alcohol | Allyl Alcohol |
| Conversion, wt. percent | 0.14 | 60 |
| Yield, g./g./hr. | 0.0015 | 0.63 |
| Relative Yield, EtOH=1 | 1.00 | 420 |

Infrared analysis on the polymer from the allyl alcohol run gave 4.9 percent 3,4-addition. The remainder was predominantly cis polymer. The polymer product was a liquid having an inherent viscosity of 0.13. Note that the yield in the allyl alcohol run was 420 times the yield from the ethyl alcohol run.

The microstructure of the polymer in the above allyl alcohol run was determined using a commercial infrared spectrometer. A sample of the polymer was dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis polyisoprene, trans is not detectable, since trans is measured at the 8.75 micron band.

*Example V*

In another run butadiene was copolymerized with isoprene in the presence of rhodium nitrate as the initiator and allyl alcohol as the diluent. The following recipe was used:

| | Parts by weight |
|---|---|
| 1,3-butadiene | 50 |
| Isoprene | 50 |
| Allyl alcohol | 210 |
| Water | 10 |
| Rhodium nitrate | 1 |
| Temperature, °C. | 50 |
| Time, hours | 63.7 |
| Conversion, percent | 30 |
| Yield, g./g./hr. | 0.47 |

The allyl alcohol diluent was charged first, the reactor was purged with nitrogen, an aqueous solution of rhodium nitrate was then introduced, and the butadiene and isoprene were then charged. The temperature was adjusted to 50° C. and the mixture was agitated throughout the polymerization period.

At the conclusion of the polymerization an isopropyl alcohol solution of 2,2'-methylene-bis(4-methyl-6-tert-butylphenol), containing 5 grams of the antioxidant per liter of solution, was added to the reaction mixture in an amount sufficient to provide 0.2 gram of the antioxidant per 100 grams of monomers charged. The unreacted monomers were vented after which the reaction mixture was poured into isopropyl alcohol. The upper alcoholic layer was removed and the lower polymer layer was dissolved in benzene and coagulated by the addition of methyl alcohol. This procedure was repeated after which the polymer was taken up in benzene, the benzene solution washed with water, and the benzene stripped to recover the polymer product. Said polymer product was a liquid which had an inherent viscosity of 0.09. Infrared analysis values for trans, vinyl, and 3,4-addition were as follows:

| | |
|---|---|
| trans, percent | 29.7 |
| Vinyl, percent | 2.0 |
| 3,4-addition, percent | 2.0 |

The 3,4-addition indicated the presence of isoprene in the product.

The procedure employed for infrared analysis of polybutadiene given above in Example II was employed for determining the trans and vinyl values on the butadiene/isoprene copolymer. The 3,4-addition was determined at the 11.25 micron band according to the procedure described in Example IV above.

The rubbery polymers, such as the trans polybutadiene polymers, produced in accordance with this invention have utility in applications where natural and synthetic rubbers are used. They can be used in the manufacture of automobile tires and other rubber articles such as gaskets, tubing, covering for wiring cable, rubber heels, rubber tile, and golf balls. The liquid polymers, such as the liquid isoprene polymers and the liquid butadiene-isoprene copolymers, produced in accordance with this invention have utility as tackifiers and/or plasticizers for both synthetic and natural rubbers. Said liquid polymers also have utility as additives to drying oils, particularly semi-drying oils such as soybean oil, cottonseed oil and the like which have their bodying and drying characteristics improved by the addition of said liquid polymers.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:
1. A method for polymerizing a conjugated diene selected from the group consisting of 1,3-butadiene, isoprene, and mixtures thereof, which comprises the step of contacting said diene under polymerization conditions with a rhodium nitrate catalyst in the presence of a diluent selected from the group consisting of 2-ethylenic alcohols having a formula selected from the group consisting of

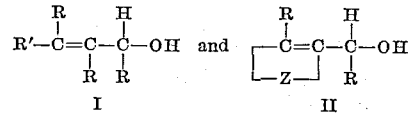

wherein:
the total number of carbon atoms in the molecule is in the range of from 3 to 10 inclusive;
each R is selected from the group consisting of a hydrogen atom, and an alkyl radical;
R' is selected from the group consisting of a hydrogen atom, alkyl, cycloalkyl, alkylcycloalkyl, aryl, aralkyl, and alkaryl radicals;
and Z is a bivalent

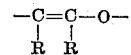

radical wherein R is as defined above.

2. A method for polymerizing a conjugated diene selected from the group consisting of 1,3-butadiene, isoprene, and mixtures thereof, which comprises the step of contacting said diene under polymerization conditions with a rhodium nitrate catalyst in the presence of a diluent selected from group consisting of 2-ethylenic alcohols having a formula selected from the group consisting of

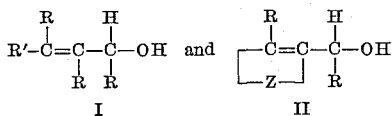

wherein:
the total number of carbon atoms in the molecule is in the range of from 3 to 10 inclusive;
each R is selected from the group consisting of a hydrogen atom, and methyl and ethyl radicals;
R' is selected from the group consisting of a hydrogen atom, alkyl, cycloalkyl, alkycycloalkyl, aryl, aralkyl, and alkaryl radicals;
and Z is a bivalent

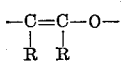

radical wherein R is as defined above.

3. The method of claim 2 wherein said diluent is allyl alcohol.
4. The method of claim 2 wherein said diluent is methyl vinyl carbinol.
5. The method of claim 2 wherein said diluent is cinnamyl alcohol.
6. The method of claim 2 wherein said diluent is furfuryl alcohol.
7. The method of claim 2 wherein said diluent is 2-buten-1-ol.
8. In a process wherein 1,3-butadiene in solution in a diluent is polymerized under polymeriaztion conditions to trans-polybutadiene in the presence of rhodium nitrate as an initiator, the improvement which comprises carrying out said polymerization in the presence of a diluent selected from the group consisting of 2-ethylenic alcohols having a formula selected from the group consisting of

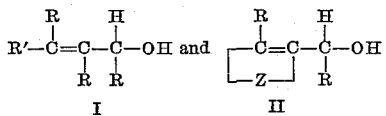

wherein:
the total number of carbon atoms in the molecule is in the range of from 3 to 10 inclusive;
each R is selected from the group consisting of a hydrogen atom, and methyl and ethyl radicals;
R' is selected from the group consisting of a hydrogen atom, alkyl, cycloalkyl, alkylcycloalkyl, aryl, aralkyl, and alkaryl radicals;
and Z is a bivalent

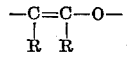

radical wherein R is as defined above.

9. A method for polymerizing 1,3-butadiene, which method comprises: contacting 1,3-butadiene with a rhodium nitrate catalyst, under polymerization conditions, in the presence of a diluent selected from the group consisting of 2-ethylenic alcohols having a formula selected from the group consisting of

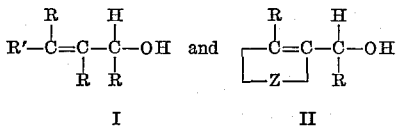

wherein:
the total number of carbon atoms in the molecule is in the range of from 3 to 10 inclusive;
each R is selected from the group consisting of a hydrogen atom, and methyl and ethyl radicals;
R' is selected from the group consisting of a hydrogen atom, alkyl, cycloalkyl, alkylcycloalkyl, aryl, aralkyl, and alkaryl radicals;

and Z is a bivalent

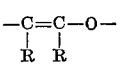

radical wherein R is defined above.

10. The method of claim 9 wherein said diluent is allyl alcohol.
11. The method of claim 9 wherein said diluent is methyl vinyl carbinol.
12. The method of claim 9 wherein said diluent is cinnamyl alcohol.
13. The method of claim 9 wherein said diluent is furfuryl alcohol.
14. The method of claim 9 wherein said diluent is 2-buten-1-ol.
15. A method for polymerizing isoprene, which method comprises: contacting isoprene with a rhodium nitrate catalyst, under polymerization conditions, in the presence of allyl alcohol as a diluent; and recovering a polymer of isoprene having a high percentage of cis 1,4-addition.
16. A method for copolymerizing a mixture of 1,3-butadiene and isoprene, which process comprises: contacting said mixture with a rhodium nitrate catalyst, under polymerization conditions, in the presence of allyl alcohol as a diluent; and recovering the polymer so produced.
17. A method for producing a polymer of a conjugated diene selected from the group consisting of 1,3-butadiene, isoprene, and mixtures thereof, which method comprises: introducing into a reaction zone a diluent selected from the group consisting of 2-ethylenic alcohols having a formula selected from the group consisting of

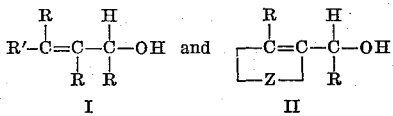

wherein:
the total number of carbon atoms in the molecule is in the range of from 3 to 10 inclusive;
each R is selected from the group consisting of a hydrogen atom, and methyl and ethyl radicals;
R' is selected from the group consisting of a hydrogen atom, alkyl, cycloalkyl, alkylcycloalkyl, aryl, aralkyl, and alkaryl radicals;
and Z is a bivalent

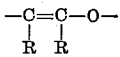

radical wherein R is as defined above;
introducing a catalyst consisting essentially of rhodium nitrate into said reaction zone; introducing said diene into said reaction zone; contacting the contents of said reaction zone at a temperature within the range of from 0 to 150° C., for a period of time within the range of from 5 minutes to 150 hours, and under a pressure sufficient to maintain said diluent substantially in the liquid phase; and recovering the polymer so produced.

18. A method for polymerizing 1,3-butadiene, which method comprises: contacting 1,3-butadiene with a rhodium nitrate catalyst at a temperature within the range of from 0 to 150° C., for a period of time within the range of from 5 minutes to 150 hours, in the presence of allyl alcohol as a diluent, and under a pressure sufficient to maintain said diluent substantially in the liquid phase; and recovering a polymer of butadiene having a high percentage of trans 1,4-addition.

References Cited by the Examiner

Rinehart et al.: Journ. Am. Chem. Soc. vol. 83, No. 23, Dec. 5, 1961, pages 4864–4865 relied on.

JOSEPH L. SCHOFER, *Primary Examiner.*

E. J. SMITH, *Assistant Examiner.*